(No Model.)
A. B. COOPER.
END GATE FOR WAGONS.
No. 317,977. Patented May 19, 1885.
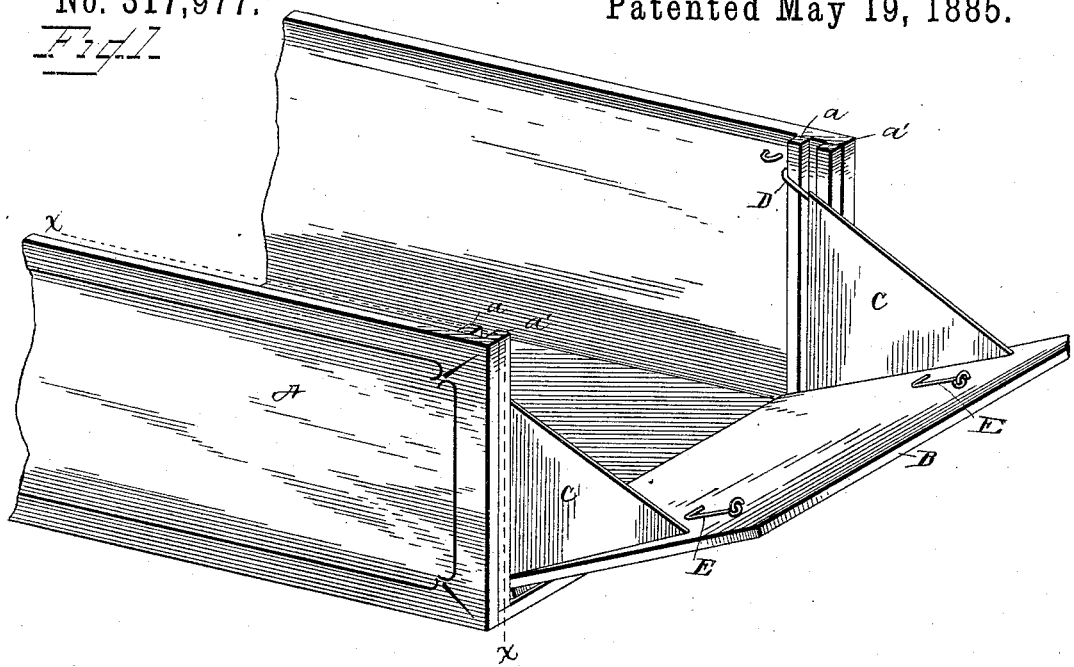
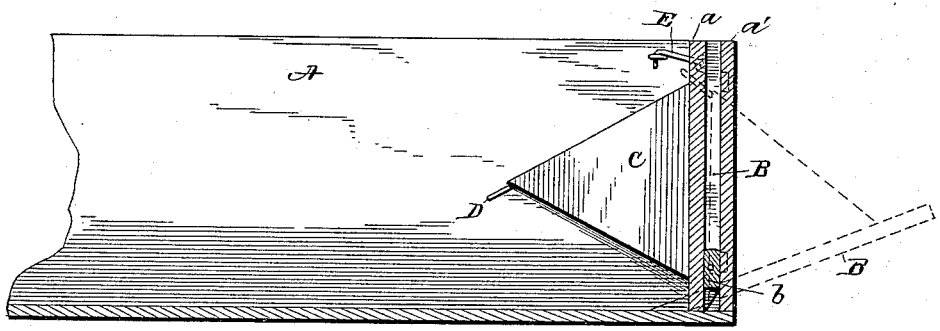

UNITED STATES PATENT OFFICE.

AMOS B. COOPER, OF SCANDIA, KANSAS.

END-GATE FOR WAGONS.

SPECIFICATION forming part of Letters Patent No. 317,977, dated May 19, 1885.

Application filed February 9, 1885. (No model.)

*To all whom it may concern:*

Be it known that I, AMOS B. COOPER, a citizen of the United States, residing at Scandia, in the county of Republic and State of Kansas, have invented certain new and useful Improvements in End-Gates for Wagons, and I do hereby declare that the following is a full, clear, and exact description of the invention, which will enable others skilled in the art to which it appertains to make and use the same.

My invention relates to end-gates for wagons, and it has for its object a gate of this character which may be held in a vertical position or lowered to an inclined position, to allow grain, &c., to be shoveled therefrom.

A further object of the invention is to provide an end-gate which shall be cheap and simple in its construction, effective in its operation, and strong and durable.

With these ends in view the invention consists in an end-gate having side wings, and means for holding the gate in a vertical or inclined position, in combination with a wagon-body having guide strips or cleats.

The invention further consists in the improved construction and combinations of parts hereinafter fully described, and pointed out in the claims.

In the drawings, Figure 1 is a perspective view of a sufficient portion of a wagon-body to illustrate the application of my invention thereto, and showing the gate inclined. Fig. 2 is a longitudinal section, showing the manner of pivoting the gate between the guide strips or cleats.

In the accompanying drawings, in which like letters of reference indicate corresponding parts in all the figures, A represents a portion of the wagon-body, which is provided at its rear end on the inner sides thereof with guide strips or cleats, $a\ a'$, two of said cleats or strips being located on each side and a suitable distance apart.

B represents the end-gate, which is provided on its ends with pivoted buttons $b$, which are adapted to fit between the guide strips or cleats, said buttons being located near the lower end of the gate, thus pivoting it between the sides of the wagon-body. The gate B is provided at its ends with inwardly-extending wings C, which, when the gate is in a vertical position, are located within the wagon-body, and when the gate is lowered or inclined close the space between the ends of the sides of the wagon and the end-board, and prevent the escape of the material being removed from the wagon. The ends of said wings are provided with inwardly-extending hooks D, which, when the end-gate is lowered, support the same in such position by engaging the inner of the cleats $a\ a'$. The said hooks are secured to the wings in the present instance by bending the upper edges of the wings, which are of metal, around the same.

Hooks E are provided on the inner side of the end-gate at each end thereof, which hooks are adapted to engage staples on the inner sides of the wagon-body.

The sides of the wagon, when the gate is to be lowered, are slightly spread apart to allow the ends of the gate to clear the cleats, and the hooks engage the inner of the cleats and support the gate in an inclined position.

The gate before described is simple in its construction, readily and easily operated, and strong and durable.

I claim as my invention, and desire to secure by Letters Patent—

1. The combination, with a wagon-body having guide-strips upon its inner sides, of a gate having pivoted buttons to fit the same, substantially as set forth.

2. The combination, with a wagon-body having guide-strips on its inner sides, of a gate having pivoted buttons to fit between the same, wings on the ends of said gate, and hooks on the ends of said wings, substantially as set forth.

In testimony whereof I affix my signature in presence of two witnesses.

AMOS B. COOPER.

Witnesses:
 M. C. PALLEY,
 CHAS. M. LAUGHLIN.